United States Patent [19]

Braham et al.

[11] 3,924,260
[45] Dec. 2, 1975

[54] METHOD AND APPARATUS FOR SUPPRESSION OF NOISE IN SEISMIC DATA

[75] Inventors: Robert M. Braham; John W. Keowski, both of Houston, Tex.

[73] Assignee: Petty-Ray Geophysical, Inc., Houston, Tex.

[22] Filed: June 27, 1974

[21] Appl. No.: 483,784

[52] U.S. Cl. .................. 340/15.5 GC; 340/15.5 CP
[51] Int. Cl.² ........................................... G01V 1/28
[58] Field of Search .............. 340/15.5 GC, 15.5 CP

[56] References Cited
UNITED STATES PATENTS

| | | | |
|---|---|---|---|
| 3,458,859 | 7/1969 | Godfrey, Jr. et al. ........ | 340/15.5 GC |
| 3,466,596 | 9/1969 | Siems et al. .................. | 340/15.5 GC |
| 3,562,504 | 2/1971 | Harris .......................... | 340/15.5 GC |
| 3,744,019 | 7/1973 | Schmitt ........................ | 340/15.5 GC |

Primary Examiner—Richard A. Farley
Assistant Examiner—H. A. Birmiel
Attorney, Agent, or Firm—Arnold, White & Durkee

[57] ABSTRACT

Method and apparatus for processing amplitude-normalized multi-channel seismic data to reduce noise contaminated data in the recorded seismic record, wherein the gain factors associated with the normalized data are compared to corresponding reference gain factors on a per-channel time increment basis. When the gains applied in normalizing the data actually received on any channel differ by a predetermined amount from the corresponding reference gains, a reject command is generated and utilized to prevent, for a predetermined time, recording of the noise contaminated data for that channel. Although blocking the recorder input prevents recording the seismic data as well as the noise during the predetermined time, the utilization of conventional stacking techniques provides an overall seismic record of high quality.

11 Claims, 7 Drawing Figures

METHOD AND APPARATUS FOR SUPPRESSION OF NOISE IN SEISMIC DATA

BACKGROUND OF THE INVENTION

In seismic exploration, sound waves are commonly used to probe the earth's crust as a means of determining the type and location of subsurface formations. The earth's crust can be considered a transmission medium or filter whose characteristics are to be determined by passing sound waves through that medium. In the reflection seismic method, sound waves or impulses are generated at a transmission point at or near the earth's surface and sound waves reflected from subsurface reflecting boundaries are received at one or more receiving points. The received waves are detected and recorded in a form which permits analysis. Skilled interpreters can discern from such an analysis the shape and depth of subsurface reflection boundaries and the likelihood of finding accumulations of minerals, such as oil and gas.

An impulse type input of seismic energy, which may comprise one or a series of impulses, is commonly used with a sound wave being transmitted into the earth over a period of time with a following period of time for receiving the reflected waves.

A seismic record is made by recording the reflected wave or waves over a selected interval, which reflections will be characteristic of the subsurface formations of the earth in that locale. In addition to the desired seismic data, the receivers or geophones also sense noise signals. If of sufficiently high level, these non-recurring noise signals can distort or even ruin a stacked seismic record by obscuring the true seismic events.

As previously mentioned, the artificially generated seismic signal is recorded over an interval of time. Since the received signal typically will decrease in amplitude as a function of time, amplifiers are commonly employed to increase the amplitude of the received signal in the latter portion of reception time. As the amplitude of the signal steadily decreases, the gain of the amplifier increases to "normalize" the amplitude of the received signal, extending the dynamic range of the system. The increased amplification of later received signals gives the desired result of making evaluation of the reflections from distant boundaries much easier.

In the seismic survey systems utilized in seismic exploration, it is common to send repeated seismic impulses into the earth, each of the impulses having the same or approximately the same characteristics. By repeating the impulse, it is possible to predict the degradation of the amplitude of later received seismic signals by utilizing the amplitude data for corresponding times in the prior seismic impulse record or records.

High level non-recurring noise, as previously mentioned, can distort the seismic record by obliterating the true seismic data. Early models of instantaneous floating point field-summing systems were designed to permit the operator to adjust a gain threshold of the amplifier by manually programming expected values of gain. By this, the operator observed the decrease in amplitude of the received seismic signal over the time interval of reception and manually set in a gain value which would approximate that amplifier gain required to normalize the received seismic signal. The operator thereby activated a blocking circuit to prevent received signals from entering the seismic recording apparatus if the gain was significantly less than that expected. For example, if the operator determined that a gain of 6 db was required to amplify the signal in a particular portion of the seismic record, a high level noise signal would require little or no gain to bring its amplitude up to that required. The system compared the programmed gain value with the gain required to amplify the received signal to the required amplitude, and, in those instances where a received signal required little or no amplification, the system would reject the input signal as being distorted by noise, along with all other input data for a preselected period of time.

Early models of the instantaneous floating point field summing system divided the seismic signal recording time interval into two increments, and only two gain thresholds were determined for the time interval. A later model of the instantaneous floating point field summing system added manual gain threshold adjusting apparatus with many manual inputs in order that the time interval could be divided into a greater number of smaller increments. This system suffered the inherent disadvantages of any system requiring a large number of manual inputs, in that the system was difficult to properly adjust and required continuous monitoring by an operator.

SUMMARY OF THE INVENTION

In field recording of seismic data, the desired seismic data often is accompanied by noise signals of sufficient amplitude to distort the seismic record. These noise components of the received signal must be removed or suppressed if the resulting seismic record is to be indicative of the reflective characteristics of the earth's formations.

The method and apparatus of this invention are employed in combination with sample normalizing amplifiers, such as instantaneous floating point amplifiers, for the processing of received seismic signals to remove the distortive effects of the noise content from the seismic data. Accordingly, a method and means are provided for ascertaining the gain factors by which the signals have been amplified in normalizing. These gain factors are determined individually for corresponding time increments of each of a plurality of seismic recording channels. That is, the noise content of incoming seismic data is analyzed on a per-channel basis. The portion of the incoming seismic data of each channel that is distorted by noise then is identified, and the noise contaminated data are not summed into the recorded seismic record.

The gain factor applied to the received signal by the sample normalizing amplifier is compared to a predetermined or predicted gain factor on a time increment basis. When a predetermined difference between the actual and expected gains is detected, the received signal is assumed to contain an unacceptable noise component. This signal and those following it for a predetermined time are not summed in the data recorder. For received signals having an amplitude sufficiently close to the expected amplitude and not following a noise signal within the predetermined time, the data are accepted and summed into the seismic record. Gain factors associated with the reference amplitudes are continually updated by gain factors associated with the actually received acceptable seismic data.

The method and apparatus of the present invention are particularly advantageous in field summing of seismic data utilizing conventional stacking techniques. They combine the desirable characteristics of being able to sum data on site, remove the effects of noise from the received data, and produce a seismic record for further processing. The summing and noise rejection techniques are applied on a per-channel basis, with only the noise contaminated portions of the data signals being excluded from the summed data.

DESCRIPTION OF THE PREFERRED EMBODIMENTS

Although the present invention is described herein with reference to a single channel of a multi-channel seismic exploration system, including a sample normalizing amplifier and a digital field summing recorder, it will be appreciated that the method and apparatus may be utilized in other applications wherein noise suppression is desired or required.

Because the method and apparatus of this invention will be utilized primarily in seismic exploration operations, its function will be described with respect to its operation on a single channel or trace of a seismic record. It will be appreciated that such data are typically multiplexed for sequential sampling and processing of the data on each channel of the overall system.

In seismic exploration, data received as a result of a seismic excitation is analog in nature, i.e., it varies continuously with time. The seismic signal, consisting of reflected seismic waves and noise, is detected by a geophone and transmitted to an amplifier for initial processing. The amplifier senses the amplitude of the received signal and determines the amplification required, if any, to output a signal having an amplitude within a predetermined range, generally one-half or more of the rated output of the amplifier. This process, known as "normalizing," is accomplished to extend the dynamic range of the seismic data acquisition and recording system to cover the range of energies of the received seismic signals. In order to further process the analog signal on a digital computer, the analog data signal is digitized by an analog-to-digital (A/D) converter. The A/D converter may be a part of the signal normalizing amplifier, or may be a separate circuit. The digital data is then further processed to eliminate the distortive noise effects and recorded, as will be discussed.

The received seismic signals include spurious signals not characteristic of the reflected seismic impulse, and commonly referred to as noise. Noise originates from various sources and becomes progressively more prevalent as seismic surveys are conducted closer to populated areas. For example, if a seismic survey were being conducted adjacent a roadway, relatively low amplitude seismic signals would be required in order to avoid structural damage to the roadway. Vehicular traffic often generates larger amplitude vibrations than the seismic signals, and the seismic receiver must distinguish between the artificially generated seismic signal and the noise in order to provide an accurate seismic record reflecting the true characteristics of the earth.

Figure 1:
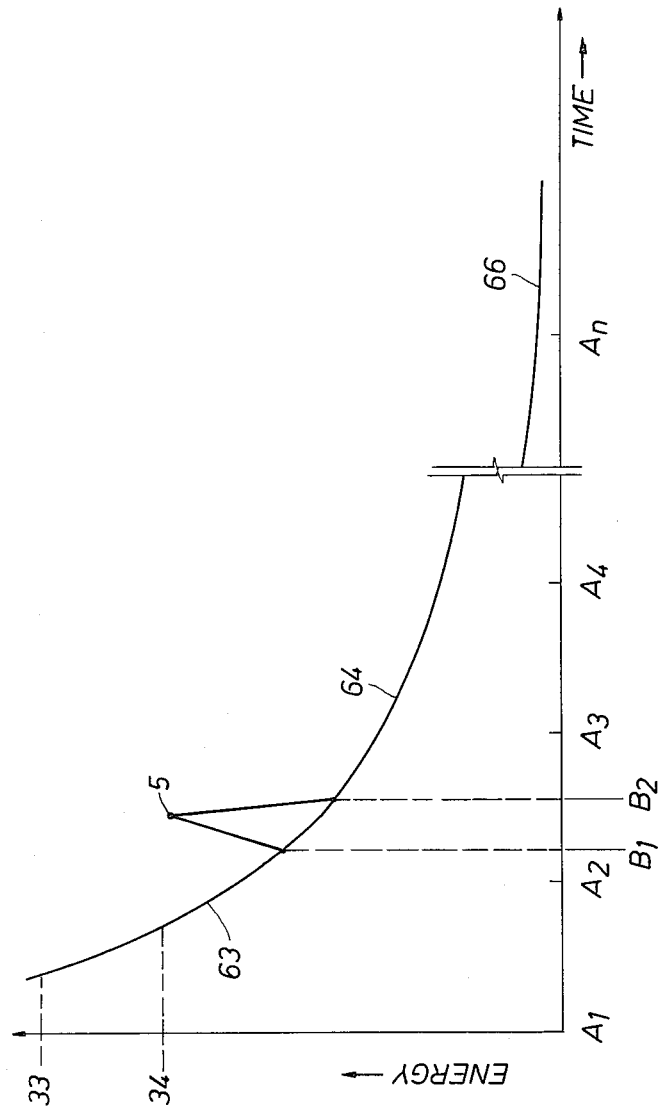
FIG. 1 is a plot of the energy characteristics of an impulse type seismic signal.

Referring now to FIG. 1, a curve 64 shows the energy characteristics of a typical adtificially produced seismic signal. The energy spike 5 represents a noise signal. The energy of the reflected wave decreases over a finite period of time, usually 6–10 seconds. One can readily observe that at the latter portion of the time period it becomes increasingly important to remove noise signals from the seismic data since the amplitude of the seismic signal is decreasing to a level where noise input will greatly distort the true characteristics of the seismic data. As amplification to normalize the seismic data signals increases, the noise signals are likewise increasingly amplified.

In order to normalize the amplitude of the received seismic signal and initiate the processing of the signal, gain factors are determined by the amplifier. The gain factor is the amplification required to increase the amplitude of a signal to a desired level. For example, the gain factor associated with the signal represented by curved 64 at point 63 will be low as compared to that associated with the signal at point 66. That is, only a small amplification need be applied to the signal at point 63, as compared to point 66, to increase the amplitude of the signal to the desired level. Applying the determined gain factor for the various points along curve 64 to the received signal results in the amplitude of the received signal being normalizied to emphasize changes in amplitude reflective of the vibrating characteristics of the earth plus other received noise signals.

The desired time interval (the seismic record time) over which the seismic signal is to be recorded is selected. The interval is divided into a number of small time increments, as for example illustrated in FIG. 1 by increments $A_1, A_2, A_3 \ldots A_n$. When a first seismic signal is received, the minimum gain of the seismic signal for each time increment is determined. In one embodiment of this invention, the gain factor for each time increment is the amplification necessary to increase the amplitude of the received signal to a value equal to 7/16 or more of the rated output of the amplifier. For example, in FIG. 1, it may be desired to amplify all received signals to an energy level between points 33 and 34. In the time increment $A_2A_3$, a gain factor will be applied to the received signal to bring its magnitude within the desired limits of points 33–34.

Figure 2:
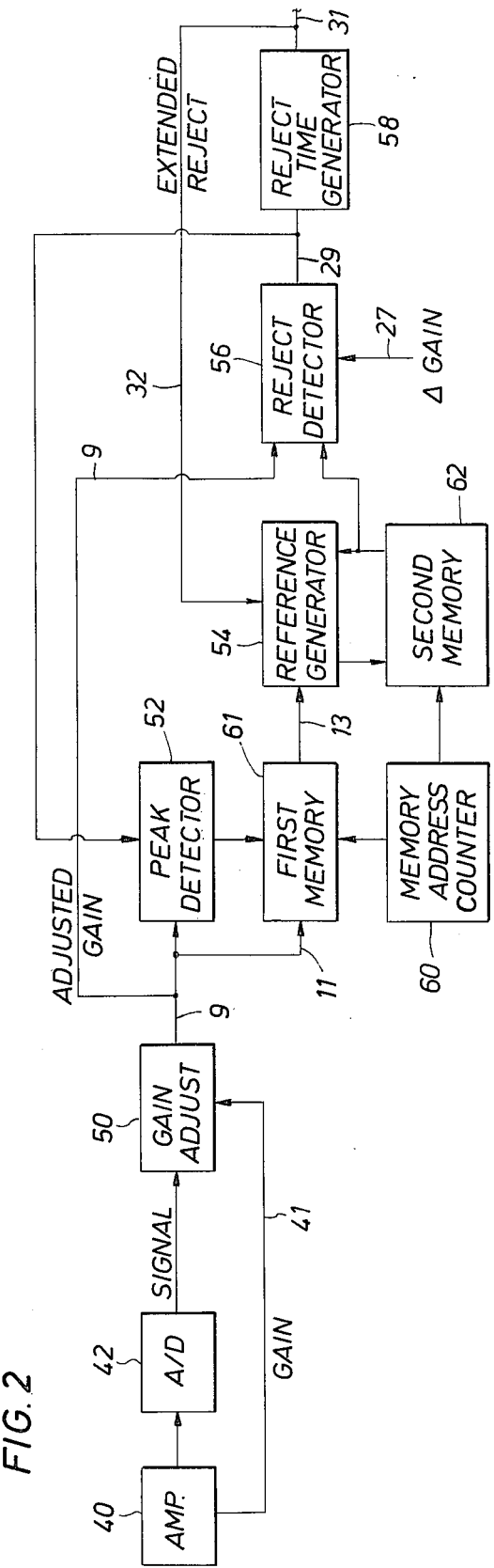
FIG. 2 is a block diagram exemplifying the basic combination of one embodiment of this invention and illustrating the processing of signals in accord with this invention.

Referring now to FIG. 2, a block diagram of the apparatus according to one embodiment of the present invention is illustrated. In this embodiment, the sample normalizing amplifier 40, which may be of the instantaneous floating point type utilized in seismic data processing systems, initially amplifies the received signals to provide a normalized output. The amplifier 40 then directs the resulting seismic amplitude data through analog-to-digital converter 42 to output a digital signal representative of the input amplitude data. A second digital signal, representing the amount of gain applied to the seismic data input signal by the amplifier 40 is the output on line 41. These data (amplitude) and gain signals are provided to a conventional digital seismic field summing recorder for recording of a stacked record. In the method and operation of the present invention these data and gain signals are also directed to apparatus hereinafter described for determination of what data are likely contaminated by unacceptable noise levels, and for signalling the summing recorder to disregard such signals in summing the seismic record.

The amplifier 40 divides the time interval of the seismic record, e.g., 4–30 seconds, into small time increments, e.g., 512 milliseconds, and determines gain factors for each increment. These data and gain signals are then supplied to a gain adjust means 50, which performs a similar function with respect to those signals, if any, not optimally amplified by the amplifier 40. That is, the gain adjust circuitry scans a portion of the data of each channel of the seismic system every 2–4 milliseconds and individually, for each channel, determines a gain factor for that time period. The 2–4 millisecond period is referred to herein as the data scan time. It will be appreciated that greater or lesser data scan times may be employed as desired. In the first scan time of each time increment, in order to initialize the circuitry, the gain factor output of amplifier 40 is increased by an arbitrary amount, for example 24 db. This arbitrary increase serves to insure that some gain factor will be introduced to the apparatus of the present invention in the first scan time, a condition which would not be satisfied in the event a large amplitude noise signal were present in the data input to amplifier 40, since a large amplitude noise signal would require no amplification and would thus have a zero gain factor. The arbitrary increase can be described as a circuit initialization operation whereby a minimum gain factor is supplied to the system. The reason for this will become apparent after considering the gain adjust circuitry.

The gain adjust means 50 functions to check the accuracy of the amplification of the seismic input signal as well as to direct the adjusted gain factor to a first memory means 61, a reject detector means 64, and a peak detector means 52.

Figure 3:
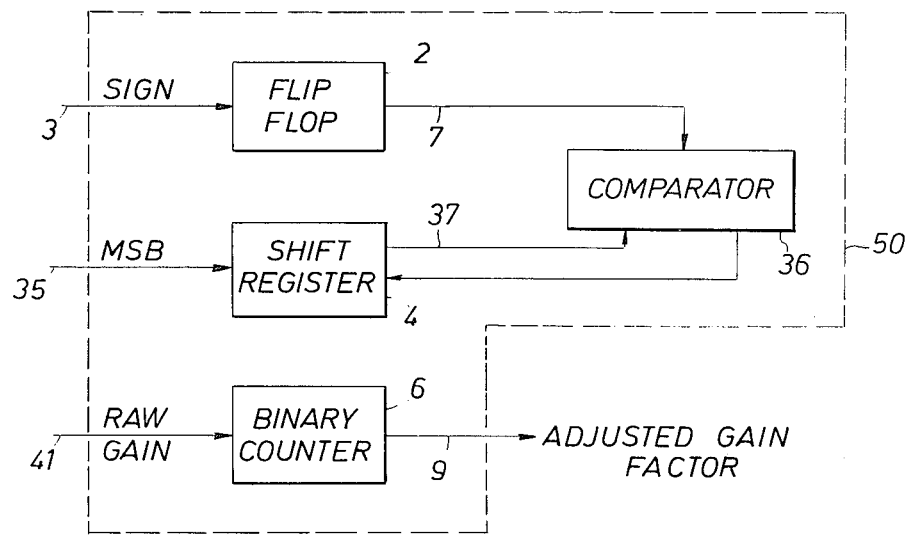
FIG. 3 is a block diagram of the gain adjust means of the combination of FIG. 2.

Referring to FIG. 3, one embodiment of a circuit comprising gain adjust means 50 is illustrated. Flip-flop 2 (which may be, for example, Texas Instruments 74LS74) receives a sign bit indicating the arithmetic sense of the seismic data signal from A/D converter 42 by line 3. The received seismic signal is sinusoidal in nature, with a portion of the signal amplitude being positive and a portion being negative. The binary value of flip-flop 2 is set to a value of 0 or 1, indicating a positive or negative value respectively of the seismic data signal. Shift register 4 (which may be, for example, one such as TI 74LS95) receives the five most significant bits of the seismic data output from the A/D converter 42 through line 35. The raw gain factor output of the sample normalizing amplifier 40 on line 41 is directed to binary counter 6 and stored for possible updating. The sign bit at terminal 7 of flip-flop 2 is compared to the binary value of the most significant bit from shift register 4, appearing on line 37, and if found to be different, shift register 4 is directed to shift the data to the next most significant bit. That is, in the instance of there being 5 data bits in shift register 4, comparator 36 compares the sign bit of flip-flop 2 with each successive bit (of the total of 5) until unlike logical values are found, at which time no further shifts occur. The comparison is accomplished by a comparator which may be, for example, a TI model 74LS86. During the process of comparing the binary value of the most significant bit in shift register 4 and flip-flop 2, it is necessary to keep track of the number of shifts, or gain steps, necessary to maximize the most significant bit. Binary counter 6 (which may be, for example, a TI 74LS191) serves this function. Through conventional control circuitry, binary counter 6 is activated each time shift register 4 applies another shift, or gain step, to the seismic data, thereby increasing or adjusting the raw gain factor supplies to it from amplifier 40 (FIG. 2) by a step of 1. Upon maximizing the most significant bit, the control circuitry of gain adjust means 50 outputs the now adjusted gain factor on line 9 for further processing. No further use is made of the seismic amplitude data, the remaining operations of the present invention being carried out on the basis of gain data.

It is important to note that an adjusted gain factor is determined for each channel of the seismic recording system every 2–4 milliseconds. When compared to the seismic record interval of 4–30 seconds one appreciates the large number of gain factors determined and the resultant accuracy of the gain curve.

It will be apparent that the raw gain factor output from the sample normalizing amplifier 40 is adjusted only when the gain applied to the particular data signal has not been optimal, and that this gain adjustment is for the purpose of identifying noise contamination of the data and does not affect the gain signal recorded in the final seismic record. Accordingly, the gain adjust means 50 of the embodiment under discussion is not required in all embodiments of the present invention. If the gain adjust means 50 were eliminated, the inventive combination herein described would operate on the basis of raw gain factors output from the amplifier 40.

Figure 4:
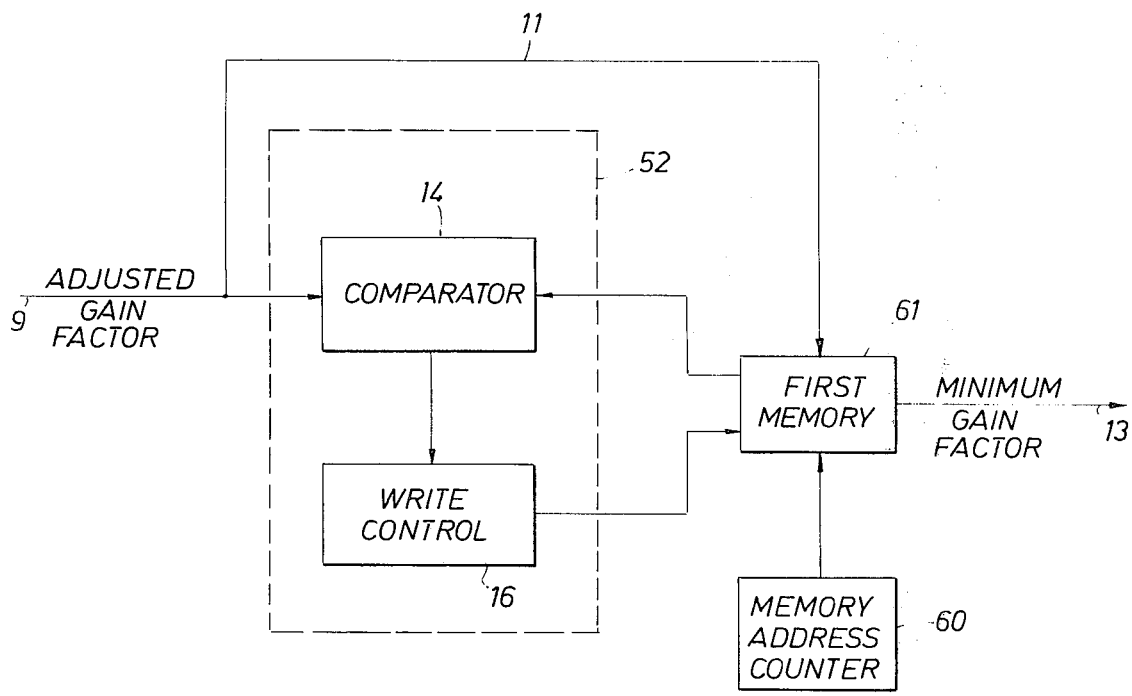
FIG. 4 is a block diagram of the peak detector means of the invention combination of FIG. 2, and illustrates the interconnection of the peak detector and first memory.

Referring again to FIG. 2, the adjusted gain factor is directed through lines 9 and 11 to first memory means 61. First memory means 61 may be, for example, a Texas Instruments model 74200. First memory means 61 stores the adjusted gain factor for each of the sampled channels. At the end of the first data scan time of the first time increment, memory 61 will contain gain factors for each channel of incoming seismic data for that data scan time. In addition to first memory means 61, the adjusted gain factor is directed to reject detector means 56 and to peak detector means 52. During each subsequent data scan time within a time increment, gain adjust means 50 determines another adjusted gain factor and directs it to first memory 61, peak detector 52, and other locations. Peak detector 52, illustrated at FIG. 4, may be comprised of a comparator 14 (such as, for example, National Semiconductor DM 8200) and write control circuitry 16.

On the first data scan of each time increment, first memory means 61 (FIG. 4) will contain no information, so write control 16 directs first memory 61 to accept and store the adjusted gain factor from this data scan. Memory address 60 (which may be a series of binary counters, for example, Texas Instruments model number 74LS197) merely directs the adjusted gain factor for each data channel to its proper storage location within first memory 61. On the second and subsequent data scans of the first time increment, the adjusted gain factor is inputted to comparator 14 and compared to the adjusted gain factor stored in first memory 61. If the second gain factor is less than the first, the second is directed by write control 16 to be written into storage within first memory 61 in place of the corresponding first gain factor. If the second gain factor is not less, the information is discarded and the first gain factor remains stored at its location within first memory 61. The process of comparing gain factors from each data scan with the gain factor in the first memory 61 and updating where required continues until the end of the first time increment of the seismic record. At this point the first memory means 61 contains a minimum gain factor individually determined for each data channel. Write channel 16 then directs these minimum gain factors to a second memory means 62 (FIG. 2) via reference generator 54. At the start of the first seismic record, the second memory 62 contains no information, thus permitting the gain factors from first memory means 61 to pass directly through reference generator means 54 to the second memory means 62. Second memory means 62 may be, for example, an Intel model 2102. At the end of the first seismic record, second memory means 62 contains a gain factor (sometimes referred to hereinafter as a reference gain) for each time increment of the record.

Figure 5:
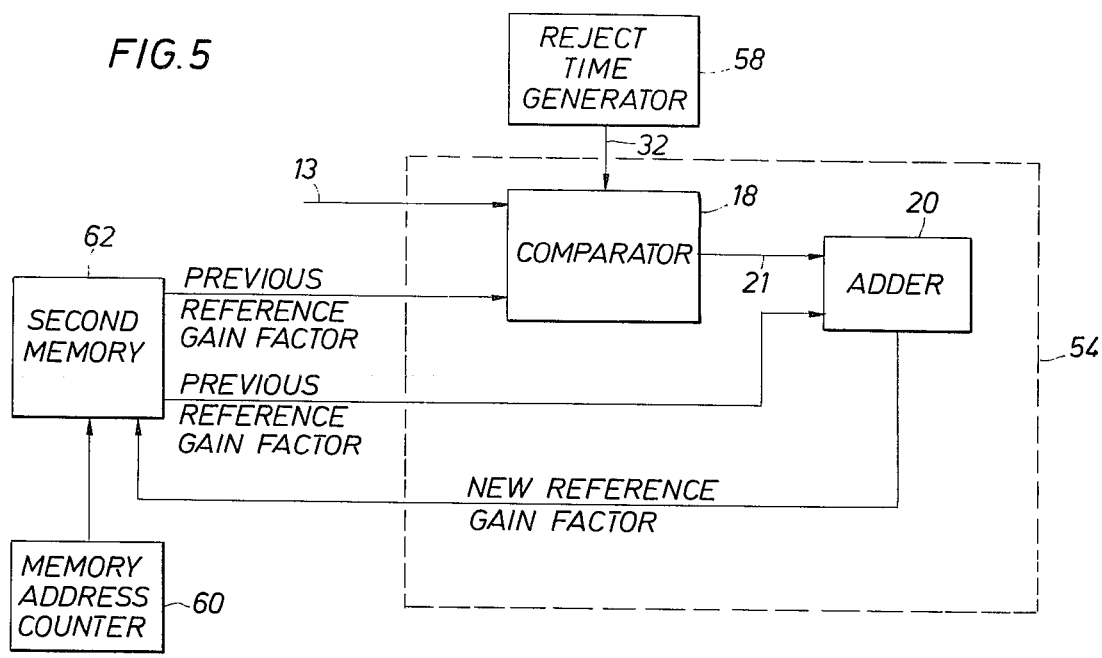
FIG. 5 illustrates in block diagram form the reference generator means of the combination of FIG. 2 and its interconnections.

After generation of the second seismic impulse, the geophones receive the reflected waves together with any noise signals for processing and recording of a second seismic record. The gain adjust means 50 performs the same function for signals of this seismic record as that of the first seismic record. That is, the gain factors are checked and maximized, directed to the first memory means 61, and, if necessary, updated from subsequent data scans within each time increment. During the second and subsequent data scan times of the first time increment of the second seismic record, the values of the gain factor determined for each data scan are compared to the reference gain for the corresponding time increment of the first seismic record. Operatively, this may be understood with reference to FIG. 4 where the minimum gain factor from first memory means 61 is output on line 13. Referring to FIG. 5, reference generator means 54 is illustrated in detail, with line 13 input to comparator 18. At stated, the minimum gain factor on line 13 is derived from the individual data scans of a time increment of the seismic record, and is the minimum gain factor for that time increment.

Figure 6:
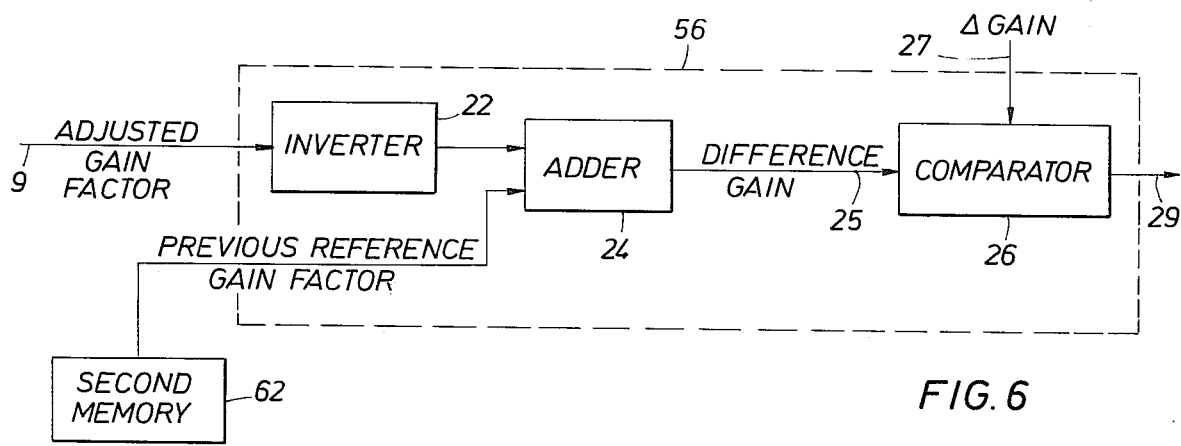
FIG. 6 is a block diagram of the reject detector means of the combination of FIG. 2, illustrating its interconnection with the second memory.

Prior to the comparator 18 making the comparison between the minimum gain factor and the reference gain, reject detector means 56 (FIG. 2) compares the adjusted gain from gain adjust means 50 and the previous reference gain factor (i.e., that reference gain factor from the corresponding time increment of the previous seismic record) stored in second memory means 62. This comparison is made between gain factors from corresponding time increments of successive seismic records. Referring to FIG. 6, reject detector 56 is illustrated. The detector 56 may be comprised of an inverter 22 (which may be, for example, TI 74LS04) an adder 24 (which may be, for example, TI 74LS84) and a comparator 26 (which may be, for example, National Semiconductor DM 8200). The adjusted gain factor from gain adjust means 50 is inputted on line 9 to adder 24 through inverter 22. The previous reference gain factor, stored within second memory means 62, is also directed into adder 24 for summing with the adjusted gain factor. Since the adjusted gain factor is opposite in arithmetic sense to the reference gain factor, the effect of adding the two signals is to determine their difference. This gain difference is output on line 25 to comparator 26 as a difference gain. Input line 27 to comparator 26 is preprogrammed with a delta gain ($\Delta$ gain) which represents the largest permissible difference between the reference gain and the adjusted gain. This difference is a relatively small value, since large changes in the adjusted gain factor from the previously determined gain factor for that time increment will most probably be attributable to noise. Thus, the difference gain is compared to the $\Delta$ gain and, for difference gains larger than the $\Delta$ gain, a reject command is generated on line 29.

The noise signals giving rise to large difference gains which are encountered in the seismic data input may be illustrated at point 5 of FIG. 1, where the input seismic data represented by curve 64 contains noise of a sufficient amplitude to present a substantial data distortion. Within the time increment $A_2A_3$, at some data scan time subsequent to the first data scan, the gain factor necessary to increase the amplitude of the noise signal $B_1B_2$ to a value between points 33 and 34 will be significantly less than that required to increase the value of the expected signal along curve 64. Of course, curve 64, being representative of an actual received seismic signal, will have variations in its amplitude reflecting the characteristics of the earth, but is shown as a smooth curve for convenience. In order to remove the noise signal $B_1B_2$, the present invention prevents all input gain and data information for that one channel from being recorded in the stacked seismic record for a selected time, upon the theory that noise will degrade to an acceptable level within the selected period.

Referring to FIG. 2, when noise is encountered, the reject command is directed to peak detector means 52 in order to prevent the first memory 61 from receiving updates corresponding to those signals whose adjusted gain factor exceeds the reference gain by the predetermined amount. That is, if the difference gain (line 25, FIG. 6) exceeds the preprogrammed $\Delta$ gain input on line 27, the reject command is issued and blocks first memory means 61 from receiving the adjusted gain factor for that data scan.

Figure 7:
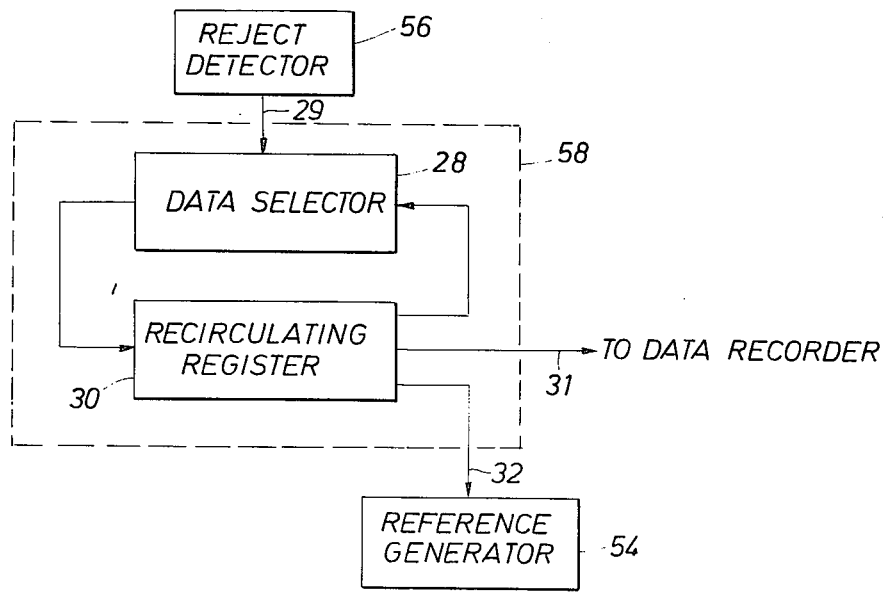
FIG. 7 is a block diagram of the reject time generator means of the combination of FIG. 2, illustrating its interconnection with the reference generator.

A reject command from reject detector 56 also goes to the reject time generator 58 by line 29. Referring to FIG. 7, one embodiment of a reject time generator in accordance with the present invention comprises a data selector 28 (which may be, for example, a TI model 74LS157) for receiving information over line 29 from reject detector 56, operatively connected to a recirculating register 30 (which may be, for example, a Fairchild First In/First Out Register, part number 3341). The reject time generator 58 is activated by a reject command on line 29 from reject detector 56, and serves to define the time period during which it is desired to block the updating of the reference gain stored in second memory 62 and to generate an extended reject signal. Reject time generator 58 directs the output (extended reject) signal over line 32 to the reference generator 54, as well as over line 31 to the field data summing recorder (not shown) for preventing the summing of the noise contaminated data into the seismic record during the predetermined reject time period.

Referring to FIG. 5, one embodiment of a reference generator 54 is shown, being comprised of a comparator 18 (which may be, for example, a National Semiconductor DM 8200) operatively connected to an adder 20 (which may be, for example, a TI model 74LS83). In those instances where the reject detector 56 has issued a reject command (caused by the difference between the adjusted gain factor and the reference gain factor exceeding the permissible Δ gain), the reject time generator 58 outputs the extended reject signal on line 32 for a predetermined time to comparator 18 of the reference generator 54, thereby blocking all input data on that channel for the predetermined time. This extended reject signal prevents information from being inputted to adder 20 through line 21, with the result that the previous gain factor directed to adder 20 is returned to the second memory 62 with no change. The extended reject continues until expiration of the predetermined timing cycle after the last reject signal from reject detector 56.

The predetermined time duration of the extended reject signal is selected based on experience with noise degradation in seismic data. It has been found that an extended delay of approximately 200 milliseconds is sufficient to insure rejection of most normally recurring noise, and will also permit the decay of non-recurring noise to an acceptable level. This value may be programmed into reject time generator 58 as the time duration for the extended reject signal. At the expiration of the time period, the extended reject signal to comparator 18 (FIG. 5) ceases, and comparator 18 then commences comparing the adjusted gain factor on line 13 with the previous reference gain factor from second memory means 62. It will be noted that the adjusted gain factor and previous reference gain factor are for comparable time increments of successive seismic records. If the adjusted gain factor differs from the previous gain factor by a level of 1 (6 db in the illustrated embodiment) or more, a command is issued to adder 20 through line 21 causing the previous reference gain factor to be updated to a new value.

In one embodiment of this invention, the change in gain level between the previous gain factor and the new reference gain factor is limited to a step of 1 (6 db) in order to prevent large changes in the reference gain factors stored in second memory 62. After changing the value of the previous reference gain factor in adder 20, the new reference gain factor is directed to second memory 62 for storage. Memory address counter 60 merely directs the new reference gain factor to the proper storage location for its associated time increment.

Accordingly, the present invention provides a greatly improved method and apparatus for automatic detection and suppression of noise contaminated seismic data, particularly adapted for use with sample normalizing floating point amplifiers in field recording of seismic data. It will be appreciated that numerous changes and modifications may be made in the disclosed embodiments of this invention without departing from the spirit and scope thereof. For example, alternate individual components and timing values and criteria may be selected by those of skill in the art without departing from the scope of the appended claims taken in view of the foregoing disclosure and accompanying drawings.

What we claim is:

1. A method of suppressing noise in seismic data wherein received seismic signals are amplified by sample normalizing amplifier means which outputs corresponding data and gain factor signals for recording to generate a seismic record, comprising the steps of:
    receiving the gain factor output signals from the amplifier means a plurality of times during each discrete time increment of a seismic record time interval;
    generating a reference gain factor for each of the discrete time increments responsive to each of the sampled gain factors;
    comparing each sampled gain factor during subsequent time intervals to its corresponding reference gain factor; and
    blocking the recording of the data and gain factor signals output from the amplifier means for a sample time and a predetermined time thereafter whenever the corresponding reference gain factor exceeds the sampled gain factor by more than a predetermined amount.

2. The method of suppressing noise in seismic data as recited in claim 1, including the steps of determining the difference between the respective reference and sampled gain factors and updating the reference gain factors by a predetermined amount for the corresponding time increments responsive to said differences.

3. The method of suppressing noise in seismic data as recited in claim 2, including the steps of sampling the data signals output from the amplifier means for each time increment, verifying the gain factor applied to each such data signal by the amplifier means, and generating an adjusted sampled gain factor for comparison with the corresponding reference gain factor to correct for amplifier errors.

4. The method of suppressing noise in seismic data as recited in claim 3, including the step of blocking the updating of reference gain factors for a predetermined time whenever the reference gain factor exceeds the corresponding sampled gain factor by more than a predetermined amount.

5. A method of suppressing noise in seismic data wherein a plurality of successive seismic impulses are generated at a first location, the resulting seismic signals are received at a second location over intervals of time, and each of the received seismic signals is amplified by sample normalizing amplifier means to output corresponding data signals and gain factor signals for summation by field summing recording means to generate a stacked seismic record, comprising the steps of:
    a. receiving the gain factor signals output from the amplifier means at a plurality of discrete time increments during the first time interval;
    b. generating a first reference gain factor for each of the time increments of the first time interval responsive to the corresponding sampled gain factors;
    c. comparing each of the gain factors sampled during the next time interval with the corresponding reference gain factors to determine the gain factor difference for each time increment of the next time interval;
    d. generating subsequent reference gain factors for each time increment of the next time interval, each next reference gain factor reflecting the gain factor difference for the conrresponding time increment of the preceeding time interval;

e. comparing each of the gain factors sampled during the next time interval with the corresponding reference gain factor to determine the gain factor difference for updating that reference gain factor;

f. blocking the recording of the data and gain factor signals in the summing recorder means for a sample time and a predetermined time thereafter whenever the reference gain factor exceeds the corresponding sampled gain factor by more than a predetermined amount; and g. repeating steps (c)—(f) for each subsequent time interval.

6. The method of suppressing noise in seismic data as recited in claim 5, including the steps of sampling the data signals output from the amplifier means for each time increment, verifying the gain factor applied to each such data signal by the amplifier means, and generating an adjusted sampled gain factor for comparison with the corresponding reference gain factor to correct for amplifier errors.

7. The method of suppressing noise in seismic data as recited in claim 6, including the step of blocking the updating of reference gain factors for a predetermined time whenever the reference gain factor exceeds the corresponding sampled gain factor by more than a predetermined amount.

8. Apparatus for suppressing noise in a seismic data output from sample normalizing amplifier means as corresponding data signals and gain factor signals for recording by seismic record generating means, comprising in combination:

input means for receiving the gain factor signals output from the amplifier means at a plurality of discrete time increments;

first memory means operatively coupled to the input means for storing the lowest gain factor received during each time increment;

peak detector means operatively coupled to the input means and to the first memory means for comparing the received gain factors with the corresponding gain factors stored in the first memory means and for replacing the stored gain factor with the sampled gain factor whenever the received gain factor is less than the stored gain factor;

second memory means for storing a reference gain factor for each time increment;

reference generator means operatively coupled to the first and second memory means for generating a reference gain factor responsive to the corresponding gain factor stored in the first memory means and for storing the reference gain factor at a corresponding location in the second memory means;

reject detector means operatively coupled to the input means and to the second memory means for comparing the received gain factors with the corresponding reference gain factors and for generating a reject command whenever the reference gain factor exceeds the inputted gain factor by more than a predetermined amount; and reject time generator means operatively coupled to the reject detector means for generating an extended reject command of predetermined duration responsive to the output of a reject command from the reject detector means.

9. Apparatus for suppressing noise in seismic data as recited in claim 8, wherein the input means includes gain adjust means for verifying the gain factor applied to each data signal by the amplifier means and generating an adjusted received gain factor responsive to detection of an amplifier error.

10. Apparatus for suppressing noise in seismic data as recited in claim 9, wherein the reject detector means is operatively coupled to the peak detector means for inputting the reject command to the peak detector means to prevent the replacement of the corresponding stored gain factor when the received gain factor is rejected.

11. Apparatus for suppressing noise in seismic data as recited in claim 9, wherein the reject time generator means is operatively coupled to the reference generator means for supplying the extended reject command to the reference generator means to disable the generation of reference gain factors for the duration of the extended reject command.

* * * * *

UNITED STATES PATENT OFFICE
CERTIFICATE OF CORRECTION

PATENT NO. : 3,924,260
DATED : Dec. 2, 1975
INVENTOR(S) : Robert M. Braham; John W. Kiowski It is certified that error appears in the above-identified patent and that said Letters Patent are hereby corrected as shown below:

The joint inventor's name is corrected to read "John W. Kiowski".

In the Specification:

Col. 4, line 18, "adtificially" is corrected to read -- artificially --.

Col. 7, line 19, "channel" is corrected to read -- control --.

Signed and Sealed this thirteenth Day of April 1976

[SEAL]

Attest:

RUTH C. MASON
*Attesting Officer*

C. MARSHALL DANN
*Commissioner of Patents and Trademarks*